United States Patent [19]

Stelter et al.

[11] Patent Number: 4,792,011

[45] Date of Patent: Dec. 20, 1988

[54] ARRANGEMENT FOR THE CONTROL OF THE FORCE-TRANSMISSION OF A FOUR-WHEEL DRIVE VEHICLE

[75] Inventors: Norbert Stelter, Weissach; Rainer Wuest, Wiernsheim, both of Fed. Rep. of Germany

[73] Assignee: Dr. h.c.F. Ing. Porsche AG, Stuttgart, Fed. Rep. of Germany

[21] Appl. No.: 147,011

[22] Filed: Jan. 13, 1988

Related U.S. Application Data

[63] Continuation of Ser. No. 787,439, Oct. 15, 1985, abandoned.

[30] Foreign Application Priority Data

Oct. 12, 1984 [DE] Fed. Rep. of Germany ....... 3437436

[51] Int. Cl.$^4$ .................................................. B60K 17/34
[52] U.S. Cl. ..................................... 180/233; 74/856; 180/197; 180/249; 192/0.076
[58] Field of Search ............. 180/233, 247, 248, 249, 180/250, 197, 252, 70.1; 74/483, 856, 857, 863; 192/0.076, 0.075, 0.055, 0.094

[56] References Cited

U.S. PATENT DOCUMENTS

| | | | |
|---|---|---|---|
| 3,411,601 | 11/1968 | Arkus-Duntov | 180/248 |
| 4,086,563 | 4/1978 | Bachman . | |
| 4,353,272 | 10/1982 | Schneider et al. | 74/859 |
| 4,466,502 | 8/1984 | Sakai | 180/248 |

FOREIGN PATENT DOCUMENTS

| | | |
|---|---|---|
| 0043237 | 1/1982 | European Pat. Off. . |
| 0076148 | 4/1983 | European Pat. Off. . |
| 0112421 | 7/1984 | European Pat. Off. . |
| 2509238 | 1/1983 | France . |
| 176119 | 10/1984 | Japan ................. 180/233 |
| 1168031 | 10/1969 | United Kingdom . |
| 2104178 | 3/1983 | United Kingdom . |
| 2118666 | 11/1983 | United Kingdom . |
| 2132303 | 7/1984 | United Kingdom . |

OTHER PUBLICATIONS

Automotive Handbook, Bosch (1984) 256–260 and 330 with corresponding translations from the 2nd Edition (1986)

vol. Berichte (Reports) Nr. 466, p. 106 (1983) and English translation of relevant portion.

*Primary Examiner*—John J. Love
*Assistant Examiner*—Everett G. Diederiks, Jr.
*Attorney, Agent, or Firm*—Barnes & Thornburg

[57] ABSTRACT

An arrangement for the control of the force-transmission of a four-wheel drive vehicle in which a main driving axle is driven directly by an internal combustion engine by way of a clutch transmission unit and an auxiliary driving axle is driven by the internal combustion engine by way of a continuously controllable longitudinal clutch. A desired traction force of all wheels is determined from a desired power output and from a velocity of the vehicle, from which a control magnitude for the control of the longitudinal clutch is obtained by a distribution factor dependent on operating or driving parameters. The longitudinal clutch can additionally be controlled either alone or advantageously also in combination with this control magnitude by a further control magnitude which is determined by a square of a rotational speed difference at the longitudinal clutch, having a weighting dependent on operating or driving parameters. The driving behavior achieved therewith enables a good steerability of the vehicle with maximum driving safety and traction.

40 Claims, 4 Drawing Sheets

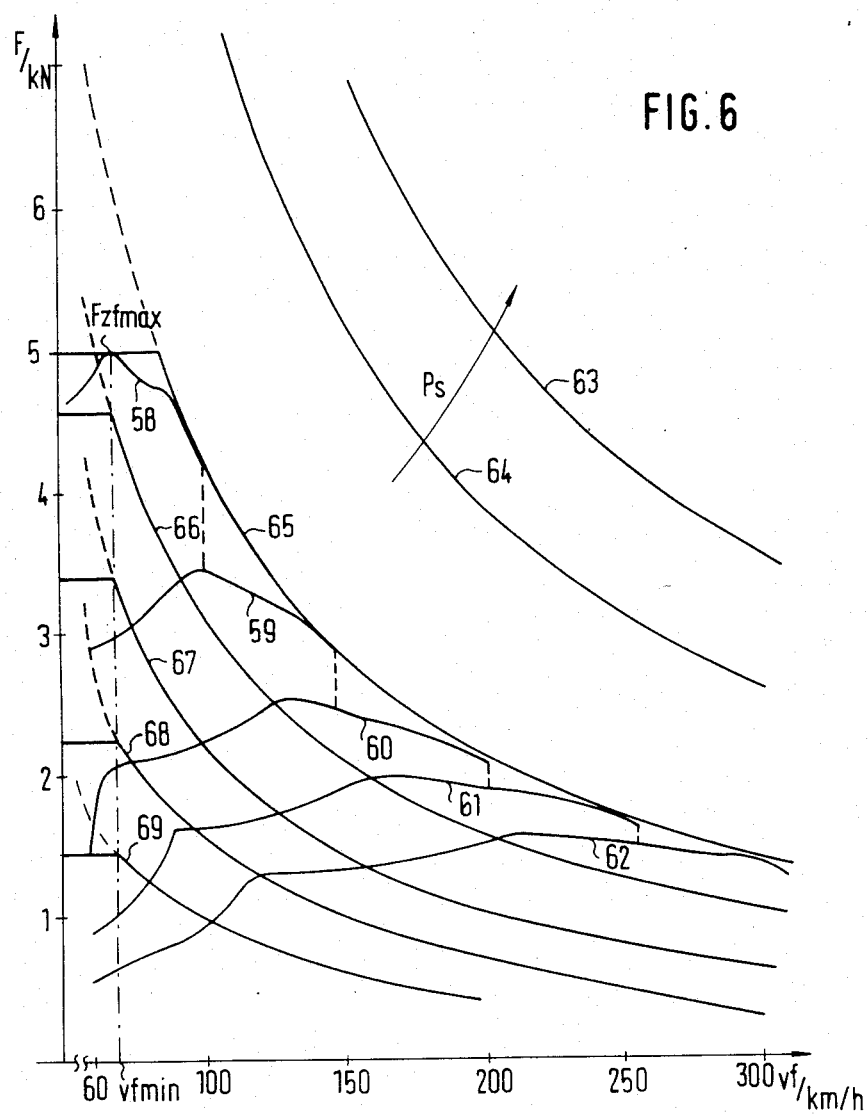

ARRANGEMENT FOR THE CONTROL OF THE FORCE-TRANSMISSION OF A FOUR-WHEEL DRIVE VEHICLE

This is a continuation application of application Ser. No. 787,439, filed Oct. 15, 1985, now abandoned.

The present invention relates to an arrangement for the force-transmission onto the axles of a four-wheel drive motor vehicle with a main driving axle provided with a cross differential and an auxiliary driving axle driven by way of a longitudinal clutch continuously controllable by means of an adjusting member.

In motor vehicles a drive system with only two driven axles frequently proves as inadequately traction-capable during the vehicle acceleration under poor road conditions. For that reason motor vehicles, also high power and cross-country vehicles are frequently equipped with a permanent four-wheel drive. The driving behavior of such types of vehicles is, as a rule, deserving of improvement, especially as regards the steerability and the driving through narrow curves. Furthermore, the good propulsion values lead at times to an overrating of the overall driving behavior of the vehicle which may lead to critical driving situations, especially when the vehicle—notwithstanding propulsion—is no longer steerable along a predetermined curve course. A "catching" of the vehicle which can be achieved also by less-skilled drivers with conventionally driven vehicles by causing an intentional load change or by pulling-up a rear axle parking brake, is not possible therewith.

For improving the traction, it is proposed in the U.S. Pat. No. 3,411,601 to undertake a torque division of a driving torque produced by an internal combustion engine onto two driven axles in order to be able to take into consideration the loads of the wheel driving axles which result from different driving conditions, and therewith the traction forces to be maximally applied.

This takes place in this prior art patent, however, only dependent on the vehicle acceleration (respectively dependent on the velocity or the engaged speed) so that no improvement of the curve driving results. Additionally, the mechanical expenditure is considerable because in each case two hydrodynamic torque converters and transmissions are necessary.

A disengagement of a blocking mechanism for differential gears of motor vehicles as a function of the steering deflection is disclosed already in the German Patent No. 459,638.

Even though the steerability of the vehicle is considerably improved therewith, an abrupt disengagement of the locking mechanism may, however, lead with poor road conditions to an unexpected, unstable driving behavior of the vehicle as a result of the jerk resulting from the inertia of the driving system.

It is therefore the object of the present invention to provide an arrangement for the control of the force-transmission onto the axles of a four-wheel drive motor vehicle, by means of which it is achieved—while maintaining a simple mechanical construction—with a relatively small number of operating and driving parameters detected by sensors and with low control expenditures that the traction-conditioned advantages of the four-wheel drive are combined with the advantages of the driving behavior of the two-wheel drive without having to accept the disadvantages thereof.

The underlying problems are solved according to the present invention in that a control apparatus, preferably equipped with a microcomputer receives input signals from an engine rotational speed measuring device, from a drive pedal pick-up or from a throttle valve angle pick-up and/or from a charging pressure and/or charging air temperature pick-up and/or from a steering angle pick-up and from an adjusting unit as well as from pick-ups which produce input signals corresponding to the velocities of the wheels at the main and auxiliary driving axle, and so produces a control magnitude for the control of the adjusting member of the longitudinal clutch that it is in a first functional relationship with at least a traction force of the wheels at the auxiliary driving axle, whereby the traction force of the wheels at the auxiliary driving axle is determined from a multiplicative linking of an amount of a desired power traction force of all wheels which is determined from a desired output and a driving velocity by way of a second functional relationship, with a distribution factor determined from the amount of the desired traction force and/or indirectly or directly from at least one of the input signals by way of a first performance graph.

The advantages of the present invention reside principally in the small number and the good measuring ability of the detected signals, the low control expenditures, the simple mechanical construction as well as the improvement of the traction and driving behavior based thereon. The automatic control of the force transmission permits to the driver to concentrate far-reachingly on the driving and to intervene under special driving conditions possibly additionally into the control. Furthermore, it is achieved by means of the arrangement of the present invention that the tire wear is reduced with a four-wheel drive and the mechanical loads of the aggregates of the force-transmission, for example, by stresses, is kept within limits and that a good operating performance of all components of the arrangement is assured.

These and further objects, features and advantages of the present invention will become more apparent from the following description when taken in connection with the accompanying drawing which shows, for purposes of illustration only, several embodiments in accordance with the present invention, and wherein:

FIG. 6 is a traction-velocity diagram of the system according to the present invention.

Figure 1:
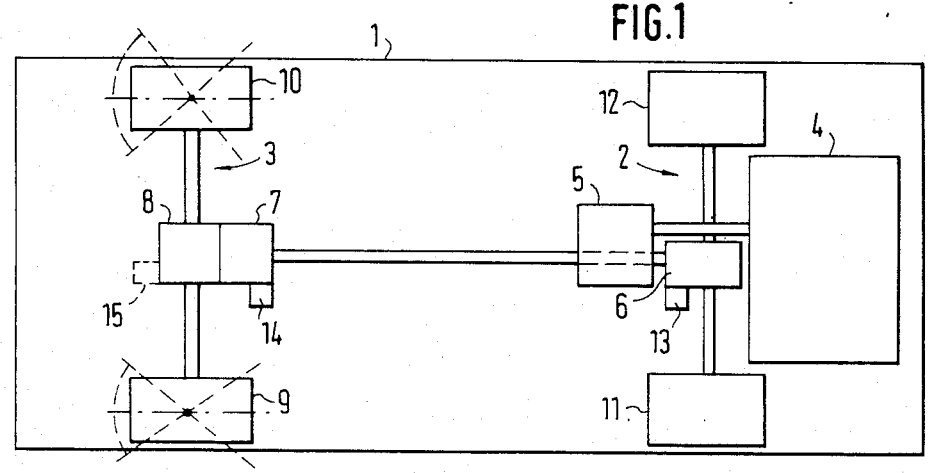
FIG. 1 is a schematic view of a drive unit of a motor vehicle in accordance with the present invention.

Referring now to the drawing wherein like reference numerals are used throughout the various views to designate like parts, and more particularly to FIG. 1, a four-wheel drive motor vehicle 1 is shown in this figure which includes a main driving axle generally designated by reference numeral 2 (rear axle) and an auxiliary driving axle generally designated by reference numeral 3 (front axle); an internal combustion engine 4 is arranged, for example, within the area of the main driving axle 2, in the instant embodiment in the rear area of the motor vehicle 1, which drives by way of a clutch-transmission unit 5 a cross differential 6 of the main driving axle 2 which is continuously controllable in its blocking action, and additionally a differential 8 of the auxiliary driving axle 3 by way of a continuously controllable longitudinal clutch 7. In a simple realization the differential 8 is constructed as customary differential gear; however, it may also be a self-locking differential gear or a differential gear continuously controllable in its locking moment. Wheels 9 and 10 at the auxiliary driving axle are constructed steerable whereas wheels 11 and 12 of the main driving axle 2 are not steerable. Adjusting members 13 and 14 for the actuation of a locking mechanism of the cross differential 6 and of the longitudinal clutch 7 are merely symbolically shown, as also an adjusting member 15, indicated in dash lines, of a locking mechanism of the differential of the auxiliary driving axle 3, which is required only in the case of a differential continuously controllable in its locking moment; the adjusting members can be flangedly connected to the aggregates, partially or completely integrated into the same or arranged at least partially outside of the same and connected therewith mechanically, hydraulically, pneumatically or electrically.

Figure 2:
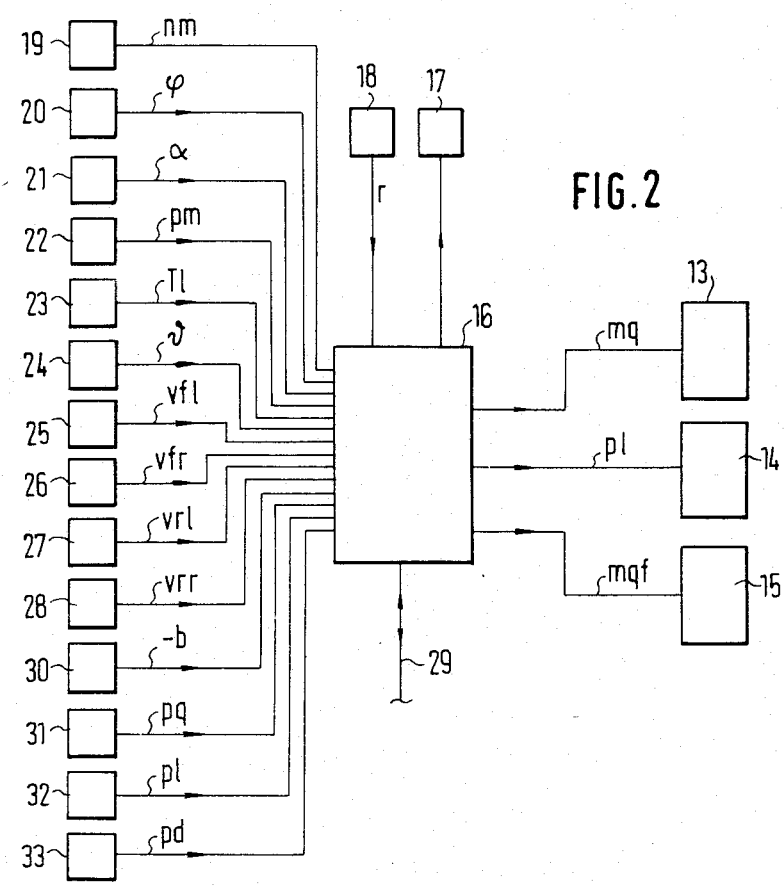
FIG. 2 is a block diagram in principle of a control apparatus with input and output magnitudes in accordance with the present invention.

The control apparatus 16 illustrated in FIG. 2 with its input and output magnitudes represents a maximal configuration in which in addition to the adjusting member 14 of the longitudinal clutch 7, also the adjusting member 13 of the cross differential 6 and the adjusting member 15 of the differential 8 are controlled. Of the connected sensors, a certain number already suffices for a good functioning of the arrangement.

It is thereby assumed that the adjusting members act linearly and eventually are provided with subordinate control circuits. Of course, the control circuits may also be implemented in the control apparatus 16. Eventual feedbacks of measured values are thereby not shown in the drawing. This is so as the connections between function blocks illustrated in the drawings are to be considered anyhow as operating lines.

The control apparatus 16 is thereby constructed preferably on the basis of a microcomputer. The construction of the control apparatus corresponds to a conventional process computer configuration with central unit (CPU), volatile and nonvolatile memories (RAMs and ROMs), input and output components, timing generators, etc.; since the construction is conventional, a detailed description thereof is dispensed with herein.

Additionally, a display 17 is connected to the control apparatus 16 which is arranged in the instrument panel of the motor vehicle and indicates to the driver informations concerning an instantaneous condition of the arrangement, for example, which differential locking mechanism is actuated as to what percentage and with what percentage rate the longitudinal clutch distributes the driving torque to the front axle; similarly, possible errors or failures in the system can be indicated on the display 17.

An adjusting unit 18 producing a control magnitude r permits an intentional influencing of the control process which can be undertaken partly by the driver and partly only by service personnel. It is to be made possible thereby to the driver, for example, to select certain control processes as a function of a road condition; it may be appropriate and meaningful, for example, with vehicles stuck in snow or loose ground to adjust a rigid through-drive to the auxiliary driving axles and possibly a complete locking of the differentials. An eventually sensor-based detection of a friction value between wheels and road surface is to be coordinated also to the adjusting unit 18.

The term "sensor-based" is not necessarily to be understood herein only to refer to the eventual sole detection of a measuring magnitude or to a conversion of the measuring magnitude into another physical magnitude, instead it may also mean a processing or pre-processing of one or several detected magnitudes.

For calculating an—internally required—desired power output Ps, the control apparatus 16 receives from an engine rotational speed measuring device 19 an engine rotational speed signal nm and either a drive pedal signal $\phi$ from a drive pedal pick-up 20 or a throttle valve angle signal $\alpha$ from a throttle valve angle pick-up 21 and in the case of a supercharged internal combustion engine, from a charging air pick-up 22 a charging air signal pm and from a charging air temperature pick-up 23 a charging air temperature signal T1.

A detection of the steering deflection by a steering angle pick-up 24 is not provided in the base versions according to the present invention because the control apparatus assures an excellent driving behavior also without a steering deflection signal $\theta$; it will be required only for achieving an ultimate refinement and is therefore mentioned only for the sake of completeness.

The control unit 16 receives from the pick-ups 25 and 26 coordinated to the wheels 9 and 10 as well as from the pick-ups 27 and 28 coordinated to the wheels 11 and 12, signals vfl, vfr, vrl and vrr which correspond to the velocities of these wheels at the auxiliary and main driving axle 3 and 2.

These signals are also required for a control apparatus of an anti-locking brake system (ABS) so that their signal detection in vehicles which are equipped with such a system, can also take in common, i.e., they are detected by one of the two systems and are made available to the other system.

An external bus system 29 is provided in the control apparatus 16, by way of which the control apparatus is able to communicate with other digital computer systems installed in the vehicle for control-, measuring- and information-purposes, for example, with a control apparatus of an ABS or an engine management computer (digital engine electronics).

Furthermore, a deceleration signal —b can be fed to the system from the control apparatus of an ABS or of a brake-light switch 30, in response to which the control apparatus 16 in a vehicle that is equipped with an ABS, controllingly disengages at least the adjusting member 14 of the longitudinal clutch 7 to such an extent that the ABS can safely detect an occurring brake slippage and can intervene regulatingly into the metering of the brake force.

In vehicles without ABS, it may also be appropriate to controllingly fully engage the adjusting members 13 to 15 during the braking in order to avoid an overbraking of individual wheels or axles.

Furthermore, pressure pick-ups 31, 32 and 33 may be connected to the control apparatus 16 which produce signals corresponding to the control pressures pq, pl, pd at the output of the adjusting members 13 to 15 for regulating, monitoring- or indicating-purposes.

Figure 3:
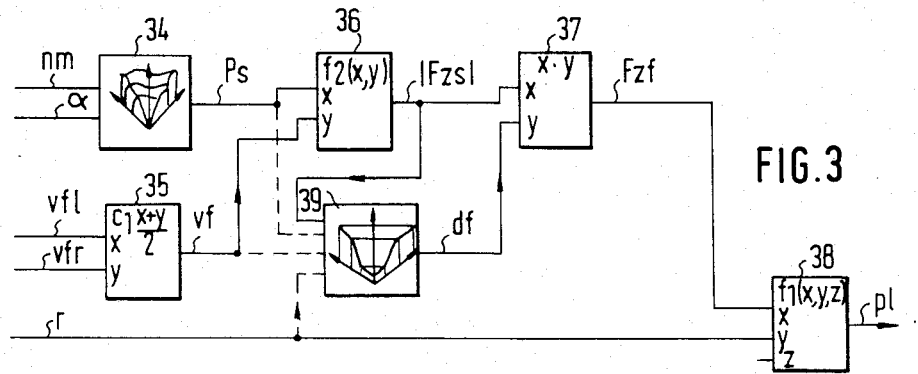
FIG. 3 is a block diagram of a control method in accordance with the present invention implemented on a control apparatus for the control of a longitudinal clutch.

The block diagram illustrated in FIG. 3 shows a control process for the control of the longitudinal clutch 7 in accordance with one embodiment of the present invention. A desired power output Ps predetermined by the driver at an instantaneous engine rotational speed is thereby determined from the engine rotational speed signal nm and the throttle valve angle signal $\alpha$ or the drive pedal signal $\phi$ by way of a throttle valve angle—rotational speed—performance graph 34. In engines which are equipped, for example, with turbochargers, a charging air pressure and a charging air temperature signal pm and T1 are additionally supplied to the performance graph 34. In case of a motor vehicle provided with a digital electronic engine control for the control of ignition and injection, as a rule a signal corresponding to the amount of the desired power output $|Ps|$ can be derived already as a rule from the engine electronic control.

A velocity vf of the wheels at the auxiliary driving axle which corresponds to a driving velocity, is determined from the wheel velocity signals vfl and vfr by way of an average value formation 35 weighted with a constant $c_1$. An amount of a desired traction force $|Fzs|$ is determined therefrom and from the desired power output Ps or the amount thereof by way of a second functional relationship $f_2$ (Ps, vf) 36 which will be explained more fully hereinafter by reference to a diagram. The amount of the desired traction force $|Fzs|$ is linked by way of a multiplication 37 with a distribution factor df into a traction force Fzf of the auxiliary driving axle and is converted by way of a first functional relationship $f_1$ (Fzf, r, pl') 38 into a control magnitude pl for the control of the adjusting member 14 of the longitudinal clutch 7. The first functional relationship 38 can be controlled additionally by further magnitudes, for example, by the control magnitude r of the adjusting unit 18 and/or by a control value pl' which, however, is to be set in this case to zero and will be explained more fully hereinafter. In the most simple case, the first functional relationship $f_1$ (Fzf, r, pl') 38 consists of a constant translation of one of its input magnitudes into the output magnitude (control magnitude) pl, however, it may also be a weighted addition of the input magnitudes or a weighted maximum value selection from the same.

The distribution factor df is determined by way of a first performance graph 39 either from the amount of the desired traction force $|Fzs|$ alone or together with the control magnitude r, or from the desired power output Ps and the velocity vf and/or the control magnitude r. It should be noted that term "performance graph" is to be considered herein as a generic term for a digitalized functional relationship stored in a memory area (that is, detected at restarting places) which in the most simple case is a constant but which may include additionally a characteristic line or a characteristic line variable by one or several parameters or even a multidimensional performance graph dependent on several magnitudes, whereby one will quantify or interpolate at values between the restarting places.

The following should also be mentioned: In the case of an amount of the desired traction force $|Fzs|$ multiplied with a constant value df, the arrangement of the present invention forms a distribution transmission with a fixed distribution of the driving torque to the driven axles (simulation of a mechanical distribution transmission by an electromechanical arrangement with a controllable clutch).

If the distribution factor df is determined by way of the first performance graph 39 exclusively from one independent variable,—the amount of the desired traction force $|Fzs|$—then a characteristic line will prove favorable which is either constant or (linearly) rising or which for small values of the independent variables has a constant value of the dependent variables corresponding to a base value dfmin, for larger values of the independent variables a value corresponding to an increasing value of the dependent variables and for still higher values of the independent variables again a constant value of the dependent variables corresponding to a maximum value dfmax.

With the use of the desired power output Ps and of the velocity vf as input magnitudes, a performance graph will prove favorable which, for small values of the amount of Ps and vf has initially a constant value of the distribution factor df corresponding to a base value dfmin, for higher values of $|Ps|$ and $|vf|$ a value corresponding to an increasing value of the distribution factor df and for still higher values of $|Ps|$ and $|vf|$ a value of the distribution factor df corresponding to a maximum value dfmax.

In case the control magnitude r is additionally processed, a characteristic line (respectively performance graph) of the first performance graph 39 may be varied in shape, base value dfmin, rise or maximum value dfmax as a function of r.

Figure 4:
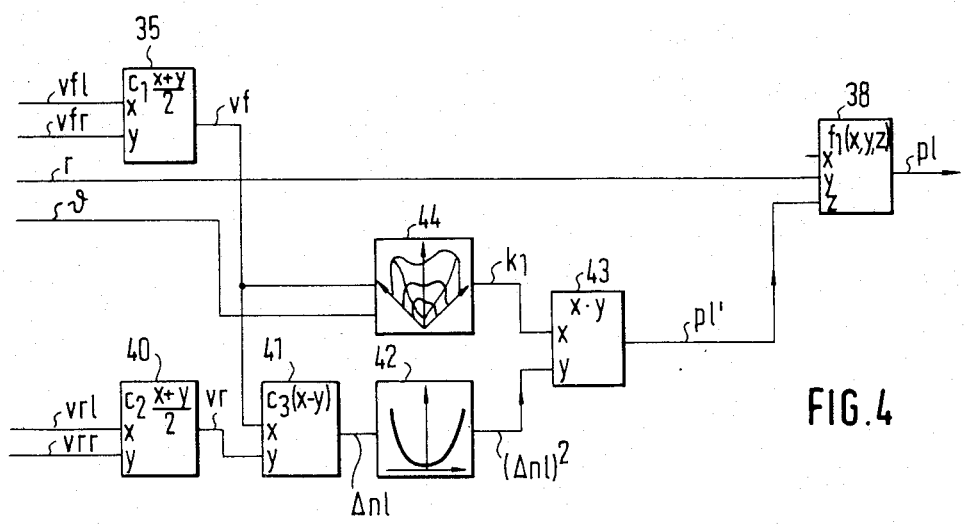
FIG. 4 is a block diagram of a further control method in accordance with the present invention implemented on a control apparatus for the control of a longitudinal clutch.

FIG. 4 illustrates a further stand-alone control process for the control of the longitudinal clutch 7 according to a modified embodiment of the present invention which, however, can be meaningfully combined with the control process according to FIG. 3, as will be more fully explained hereinafter by reference to FIG. 5. The average value formation 35 for gaining vf and the first functional relationship 38 correspond to the relationships described by reference to FIG. 3, with the limitation that the input magnitudes Fzf of the first functional relationship 38 has now been set to zero and is now acted upon with the control value pl'.

A velocity vr of the wheels at the main driving axle 2 is determined from the wheel velocity signals vrl and vrr by way of an average value formation 40 weighted with a constant $c_2$. A rotational speed difference $\Delta nl$ at an input and output shaft of the longitudinal clutch 7 results from a difference 41, weighted with a constant $c_3$, of the velocities of auxiliary and main driving axles vf and vr, which is composed into the control value pl' by raising to a higher power (exponential treatment), preferably by square formation 42 and multiplication 43 with a factor $k_1$.

The factor $k_1$ can either be selected constant or can be determined by way of a second performance graph 44 from vf and/or the steering deflection signal $\theta$.

In the case of a constant factor $k_1$, the control of the longitudinal clutch corresponds to a centrifugal force regulation of the rotational speed difference $\Delta nl$ at the longitudinal clutch (clutch slippage).

If $k_1$ is determined alone from the velocity vf, then the second performance graph consists of a characteristic line which rises with an increasing value of the velocity $|vf|$. If additionally the steering deflection $\theta$ is monitored at the same time, then the output magnitude $k_1$ of the second performance graph is relatively strongly reduced with increasing amount of the steering deflection in order to enable a good steerability of the motor vehicle.

Figure 5:
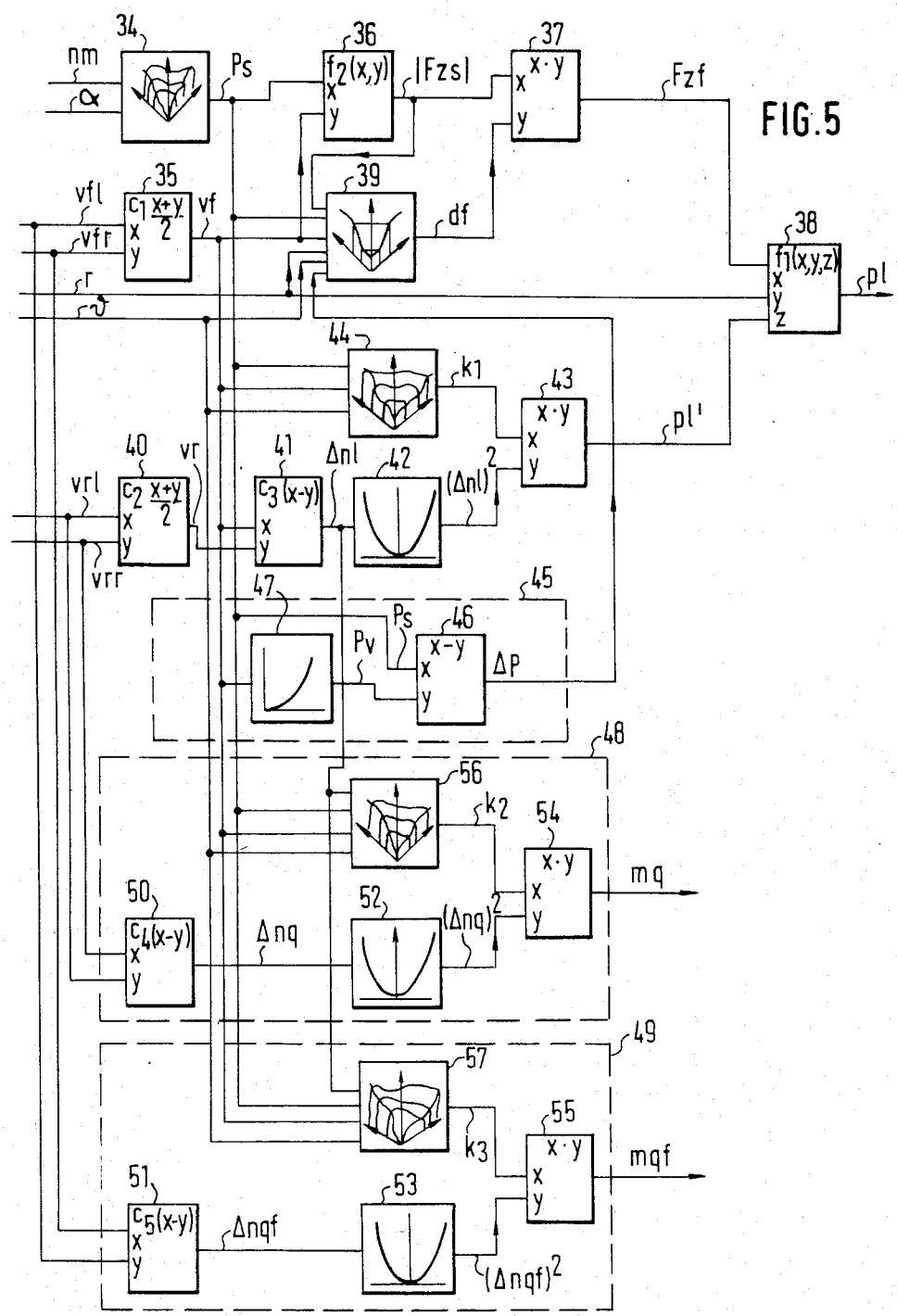
FIG. 5 is a block diagram of a combination of the control methods according to FIGS. 3 and 4 with an expansion for the additional control of differentials at a main driving axle and at an auxiliary driving axle in accordance with the present invention.

A combination of the control processes according to FIGS. 3 and 4, respectively, of their output magnitudes Fzf and pl′ and their common processing, eventually additionally with the control magnitude r, by means of the first functional relationship $f_1$ (Fzf, r, pl′) 38 is illustrated in FIG. 5.

The control process according to FIG. 4 thereby represents an "excess rotational speed protection" (limitation of the clutch slippage Δnl) and is therefore extremely meaningful and still more effective in the combination for achieving a good driving behavior than one of the processes by itself.

Expansions of the first control process according to FIG. 3 by an additional influencing of the first performance graph by way of a power output excess ΔP (function block 45, with increasing amount of ΔP, df becomes larger) and/or of the steering deflection signal θ (with increasing steering deflection, df is relatively strongly reduced) are also indicated in FIG. 5; the power output excess ΔP is thereby calculated from a difference 46 from the desired power output Ps and a driving resistance power Pv determined by way of a driving resistance characteristic line 47 from the velocity vf of the wheels at the auxiliary driving axle.

Additionally shown in FIG. 5 are function blocks 48 and 49 for the control of a cross differential 6 of the main driving axle 2 continuously. controllable in its locking action and of a differential 8 of the auxiliary driving axle also continuously controllable in its locking action.

The functional course for the determination of a locking moment control magnitude mq for the control of the cross differential 6 and of a locking moment control magnitude mqf for the control of the differential 8 is thereby far-reachingly identical with that for the determination of the control value pl′; however, the corresponding performance graphs and characteristic magnitudes require another matching, especially also matching to specific vehicles.

A rotational speed difference Δnq at the output shafts of the cross differential 6 and, Δnqf at the output shafts of the differential 8 results from a difference 50, 51, weighted with a constant $c_4$, $c_5$ of the wheel velocity signals vrl and vrr at the main driving axle and vfl and vfr at the auxiliary driving axle. The rotational speed difference Δnq and Δnqf is composed into the locking moment control magnitudes mq, mqf by raising to a potential, preferably by square formation 52, 53 and multiplication 54, 55 with a factor $k_2$, $k_3$.

The factors $k_2$, $k_3$ can thereby be selected again constant or can be determined by way of a third performance graph 56, and a fourth performance graph 57 from the rotational speed difference Δnl at the input and at the output shaft of the longitudinal clutch 7 and/or the desired power output Ps and/or the velocity vf of the wheels at the auxiliary driving axle and/or the steering deflection signal θ. The factors $k_2$, $k_3$ will thereby increase with increasing values of the rotational speed difference Δnl at the longitudinal clutch 7; of the desired power output Ps and of the velocity vf and will relatively strongly decrease with increasing amount of the steering deflection, especially at the axle with steered wheels. The third performance graph 56 and the fourth performance graph 57 as well as the number and selection of the input magnitudes may thereby be different.

The constants $c_1$ to $c_5$, the first and second functional relationships 38, 36 and the first to fourth performance graphs are only generally indicated because they require a different matching to the respective vehicle type. The constants $c_1$ to $c_5$ are thereby fixed by wheel diameters and transmission ratios. In contrast thereto, the indication of a specific example for the design of the functional relationships and the performance graphs is therefore of little value whence only general guidelines have been indicated herein, by means of which these can be matched by a person skilled in the art without any problem to the different types of vehicles.

A more detailed description will be made only with respect to the second functional relationship $f_2$ (Ps, vf) 36 for the determination of the amount of the desired traction force |Fzs| from the desired power output Ps and the velocity vf of the wheels at the auxiliary driving axle and will be explained by reference to a velocity-traction-force diagram according to FIG. 6.

Viewed purely mathematically, the desired traction force Fzs is calculated from a division of the desired power output Ps by the velocity vf. However, for velocities vf approaching zero, the desired traction force Fzs would approach infinity which is not plausible for physical reasons for a desired value preselection (maximum traction force limited by frictional value limit between wheel and road). Furthermore, the division with zero which would result with vf=0 is not permitted in mathematics and leads generally to a program collapse.

In the velocity traction diagram of FIG. 6, velocity traction characteristic lines of speeds 1 to 5 (58 to 62) of an auxiliary driving axle of a vehicle are illustrated, which represent the maximum possible traction forces of the wheels at the auxiliary driving axle of a vehicle in the individual speeds with corresponding velocity vf. The maximum value of the traction force Fzfmax of the wheels at the auxiliary driving axle, which is permitted at all, results at a velocity vfmin along the characteristic line 58 of the first speed. A vertical transition indicated in dash lines from a characteristic line to the next characteristic line symbolizes a necessary shifting operation upon reaching a maximum rotational speed of the engine.

Characteristic lines 63 to 69 indicate a traction force appertaining to a certain output Ps=constant with a certain velocity vf. They are hyperbolically shaped because the traction force results from the division of the desired power output Ps by the velocity vf; the characteristic line 63 may correspond, for example, to a tractional force with maximum possible engine output.

The characteristic line 65 represents one outline or end of the velocity-traction force characteristic lines 56 to 62 and may thereby be considered as maximum possible traction force Fzfmax of the wheels at the auxiliary driving axle.

The calculation of the desired traction force Fzs from the division of the desired power output Ps by the velocity vf however, is no longer meaningful for values of velocities smaller than vfmin for the aforementioned reasons so that a constant value dependent exclusively from the desired output will be better outputted thereat as output value of the second functional relationship 36, especially when the distribution factor df is determined alone from the value of the desired traction force |Fzs|. It is appropriate to limit the output value of the second functional relationship $f_2$ (Ps, fv) to a value Fzsmax which corresponds to the maximum possible value of the traction force Fzfmax of the wheels at the auxiliary driving axle with a maximum value of the distribution factor dfmax. These two conditions are indicated by the bent-off (horizontally extending) portions of the characteristic lines 65 to 69 for the traction force Fzf of the wheels at the auxiliary driving axle with Ps=constant. Otherwise, a maximum value of the traction force Fzf of the auxiliary driving axle would exist at the output of the multiplication 37 which would produce a fixed through-drive to the front axle, by means of which in the final analysis, the vehicle would be nearly impossible to steer during starting of the drive or during parking.

Of course, the arrangement of the present invention is also suitable for a control of a controllable distribution transmission, respectively, of an intermediate differential continuously controllable in its locking action with the control value pl, especially with the arrangement according to FIG. 4.

The amount of the traction force |Fzs|, the distribution factor df, the first, second and third factor $k_1$, $k_2$ and $k_3$ as well as the driving resistance power Pv are determined conventionally from the driving velocity. Since, however, slippage should occur more rarely at the auxiliary driving axle than at the main driving axle, the driving velocity can be equated to the velocity of the wheels at the auxiliary driving axle. This, however, does not preclude that the driving velocity can also be determined in some other way, for example, by contactlessly measuring sensors or by average value formation from the velocities of all wheels. Similarly, the value can also be monitored for plausibility in the course of the calculating process and can also be estimated or corrected in the case of nonplausible values.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A system for the control of the force transmission onto axle means of a four-wheel drive motor vehicle, comprising:
   a main driving axle means provided with a cross differential means;
   an auxiliary driving axle means driven by way of a longitudinal clutch means continuously controllable by an adjusting means;
   a control apparatus which receives input signals from engine rotational speed measuring means, from at least one of drive pedal pick-up means, throttle valve angle pick-up means, charging air pressure pick-up means, steering angle pick-up means, an adjusting unit, and pick-up means which produce input signals corresponding to the velocities of the wheels at the main and auxiliary driving axle means;
   said control apparatus being operable to produce in response to said input signals a control signal for controlling the adjusting means of the longitudinal clutch means in such a manner that it is in a first functional relationship with a traction force of at least one of the wheels at the auxiliary driving axle means;
   desired power output means for determining a desired power output from said engine rotational speed measuring means and at least one other of said input signals;
   said control apparatus including driving velocity determining means for determining a driving velocity from input signals received by at least one of said pick-up means;
   multiplication means for determining the traction force of the wheels at the auxiliary driving axle means by a multiplication of an amount of a desired traction force of all wheels with a distribution factor, said amount of a desired traction force of all wheels being determined from said desired power output and from said driving velocity by a second functional relationship, and said distribution factor being determined from the amount of the desired traction force of all the wheels and from at least one of the input signals by a first performance graph means connected to said multiplication means.

2. An arrangement according to claim 1, wherein said control apparatus includes a microprocessor.

3. An arrangement according to claim 2, wherein the first functional relationship comprises a weighted sum, of the traction force at the auxiliary driving axle means and a signal from the adjusting unit.

4. An arrangement according to claim 2, wherein said control apparatus includes means for producing a control signal for controlling the adjusting means of the longitudinal clutch means in such a manner that it is in a functional relationship with at least one control value that corresponds to a raised power provided with a first factor of a rotational speed difference at an input shaft and an output shaft of the longitudinal clutch means.

5. An arrangement according to claim 4, wherein the first factor is determined by second performance graph means from at least one of driving velocity, desired power output and steering deflection signal and the first factor increases with increasing values of the amount of the velocity and of the amount of the desired power output and decreases with increasing values of the amount of the steering deflection signal.

6. An arrangement according to claim 1, wherein the second functional relationship for driving velocities which in the amount thereof are larger than a predetermined velocity, consists of a division of an instantaneous desired power output by an instantaneous driving velocity, and with driving velocities which, in the amount thereof are smaller than a predetermined velocity, consists of a division of an instantaneous desired power output by the predetermined velocity whereby in both cases the output value of the second functional relationship is limited to a maximum value.

7. An arrangement according to claim 6, wherein the first performance graph means, with a desired power output and at least one of a driving velocity and an amount of the traction force nearly equal to zero, has a base value corresponding to a predetermined distribution factor, with increases of the amount of one of the independent variables has initially an increasing distribution factor as dependent variable and with still higher amounts of the independent variables has a distribution factor corresponding to a maximum value as dependent variable.

8. An arrangement according to claim 6, wherein the first performance graph means is additionally influenced by the adjusting unit and at least one of shape, base value and maximum value is varied in dependence on the adjusting unit.

9. An arrangement according to claim 1, wherein the first performance graph means is composed of characteristic lines whose independent variable is the amount of the desired traction force of all the wheels and whose dependent variable is the distribution factor and which with small values of the independent variables are initially constant corresponding to a predetermined base value of the dependent variables and for higher values of the independent variables are increasing and for still higher values of the independent variables are again constant corresponding to a predetermined maximum value of the dependent variables.

10. An arrangement according to claim 9, wherein the characteristic lines can be selected dependent on the adjusting unit.

11. An arrangement according to claim 9, wherein the characteristic lines can be varied in at least one of shape, base value and maximum value by means of the adjusting unit.

12. An arrangement according to claim 9, wherein the predetermined maximum value corresponds to a ratio of a stationary axle load distribution.

13. An arrangement according to claim 1, wherein the auxiliary driving axle means is equipped with a self-locking differential means.

14. An arrangement according to claim 1, wherein the control apparatus in a vehicle which is equipped with an anti-locking brake system, receives from the control unit thereof or from a brake light switch means a signal during a braking operation and controllingly turns off at least the adjusting means of the longitudinal clutch means 15. An arrangement according to claim 1, wherein the control apparatus during the occurrence of a signal from at least one of a brake light switch means and from a deceleration pick-up means controllably engages the adjusting means of the longitudinal clutch means.

16. An arrangement according to claim 1, wherein said auxiliary drive axle means includes a differential means and wherein the control apparatus includes means during the occurrence of a signal from at least one of a brake light switch means and a deceleration pick-up means for locking the differential means of at least one of main and auxiliary driving axle means.

17. An arrangement according to claim 1, wherein a display means is provided in an instrument panel of the motor vehicle, on which an actual condition of the arrangement is represented.

18. An arrangement according to claim 1, wherein the control apparatus is operable to communicate by way of a bus system with other digital computer systems installed in the vehicle for control-, measuring- and information-processing purposes.

19. An arrangement according to claim 1, wherein the control apparatus is based at least in part on hardware technology.

20. An arrangement according to claim 1, wherein the control apparatus includes a self-test function means and is operable to test the arrangement continuously for its proper functioning and indicates any failures.

21. An arrangement according to claim 20, wherein the failures are indicated on a display means in the instrument panel.

22. An arrangement according to claim 1, wherein the arrangement can be transferred by the driver by way of the adjusting unit into a defined condition independent of the control apparatus.

23. An arrangement according to claim 1, wherein a controllable distributor transmission or an intermediate differential continuously controllable in its locking action is controlled by means of the control apparatus, by way of which the main and auxiliary driving axle means are driven.

24. An arrangement according to claim 1, wherein the driving velocity is determined from an average value of the velocity of the wheels at the auxiliary driving axle means.

25. An arrangement according to claim 1, wherein the the first performance graph means is composed of characteristic lines whose independent variable is the amount of the desired traction force of all the wheels and whose dependent variable is the distribution factor and which are linearly increasing in the independent variables.

26. An arrangement according to claim 1, wherein the the first performance graph means is composed of characteristic lines whose independent variable is the amount of the desired traction force of all the wheels and whose dependent variable is the distribution factor and which are constant.

27. An arrangement according to claim 1, wherein said control apparatus includes means for producing said control signal for controlling the adjusting means of the longitudinal clutch means in such a manner that it is in a first functional relationship with at least one control value that corresponds to a raised power provided with a first factor of a rotational speed difference at an input shaft and an output shaft of the longitudinal clutch means.

28. An arrangement according to claim 27, wherein the first functional relationship comprises at least one of said traction force, said control value and said control signal from the adjusting means.

29. An arrangement according to claim 27, wherein the first functional relationship comprises at least one of a base value controllable by the adjusting means and a maximum value providing full through-drive to the auxiliary driving axle means.

30. An arrangement according to claim 1, wherein the distribution factor determined from the first performance graph means is additionally dependent from a power output excess which results from a difference of the desired power output and a driving resistance power output determined from the driving velocity by way of a driving resistance characteristic line, and wherein the distribution factor becomes larger with increasing power output excess.

31. An arrangement according to claim 1, wherein the cross differential means is continuously controllable in its locking action and wherein the control apparatus is operable to control a locking moment control signal of the cross differential means that it corresponds to a raised power provided with a second factor of a rotational speed difference at the output shafts of the cross differential means.

32. An arrangement according to claim 31, wherein the auxiliary driving axle means is provided with a further differential means controllable continuously in its locking action, and wherein the control apparatus is operable to control a locking moment control signal of the further differential means that it corresponds to a raised power provided with a third factor of a rotational speed difference at the output shafts of the further differential means.

33. An arrangement according to claim 32, wherein the second factor is determined by way of a third performance graph means from at least one of rotational speed difference at the longitudinal clutch means, driving velocity, desired power output and steering deflection signal, and wherein the second factor increases with increasing values of the amount of rotational speed difference, of the amount of driving velocity and of the amount of desired power output and decreases with increasing values of the amount of steering deflection signal.

34. An arrangement according to claim 33, wherein the third factor is determined by way of a fourth performance graph means from at least one of rotational speed difference at the longitudinal clutch means, the driving velocity, the desired power output and the steering deflection signal, and wherein the third factor increases with increasing values of the amount of the rotational speed difference, of the amount of the driving velocity and of the amount of the desired power output and decreases with increasing values of the amount of the steering deflection.

35. An arrangement according to claim 1, wherein the first performance graph means is influenced by a friction value sensor-detected by the adjusting means.

36. An arrangement according to claim 1, wherein the adjusting unit produces control magnitudes which are variable partly by a driver and partly only by servicing personnel.

37. A system for the control of the force transmission onto the axle means of a four-wheel drive motor vehicle, comprising a main driving axle means provided with a cross differential means, an auxiliary driving axle means driven by way of a longitudinal clutch means continuously controllable by an adjusting means, a control apparatus which receives input signals from an engine rotational speed measuring means, from at least one of a drive pedal pick-up means, throttle valve angle pick-up means, charging air pressure pick-up means, charging air temperature pick-up means and pick-up means corresponding to velocities of wheels at said auxiliary driving axle means, said control apparatus including means for determining a driving velocity from input signals received by at least one of said pick-up means, said control apparatus including means for producing a control signal for controlling the adjusting means of the longitudinal clutch means in such a manner that it is in a first functional relationship with a traction force of at least one of the wheels at the auxiliary driving axle means, the traction force of the wheels at the auxiliary driving axle means being determined by multiplication of an amount of a desired traction force of all wheels with a distribution factor, said amount of a desired traction force of all wheels being determined from at least two of said input signals and said driving velocity by way of a second functional relationship, and said distribution factor being determined from the amount of the desired traction force of all wheels and from at least one of the input signals by way of a first performance graph means.

38. An arrangement according to claim 37, wherein the first performance graph means is additionally influenced by the adjusting means and at least one of shape, base value and maximum value are varied in dependence on the adjusting means.

39. An arrangement according to claim 37, wherein the driving velocity is determined from an average value of the velocity of the wheels at the auxiliary driving axle means.

40. An arrangement according to claim 37, wherein the first functional relationship comprises a weighted sum of the traction force at the auxiliary driving axle means and rom an adjusting means.

* * * * *